Figure 1:
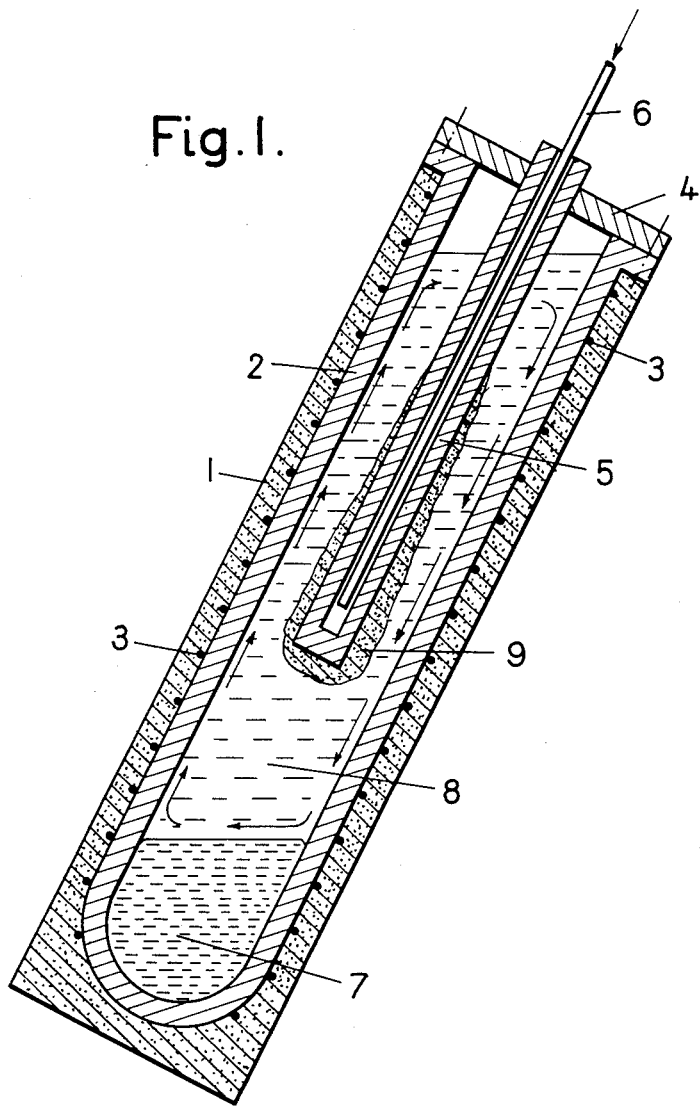

Dec. 9, 1952   K. H. PEDERSEN ET AL   2,621,120
PROCESS OF REFINING ALUMINUM

Filed July 20, 1949   3 Sheets-Sheet 1

Inventors
K. H. Pedersen
H. J. Bauck
By Glascock Downing Ruble
Attys.

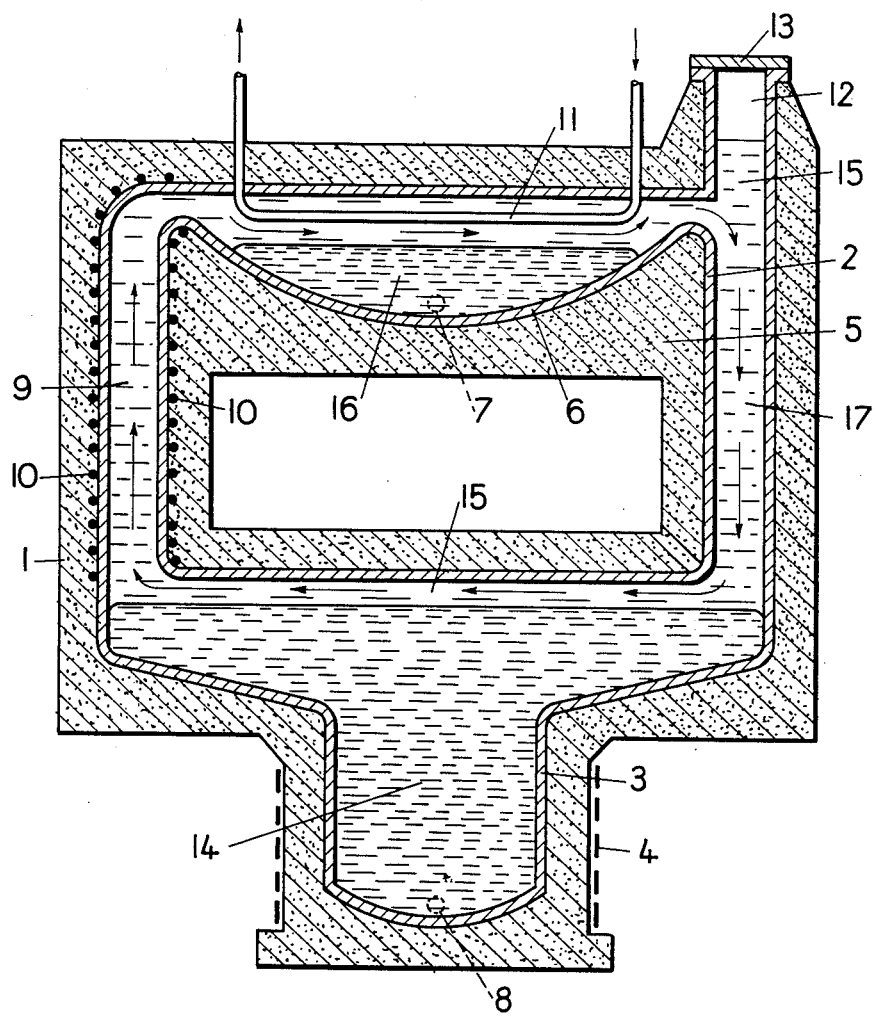

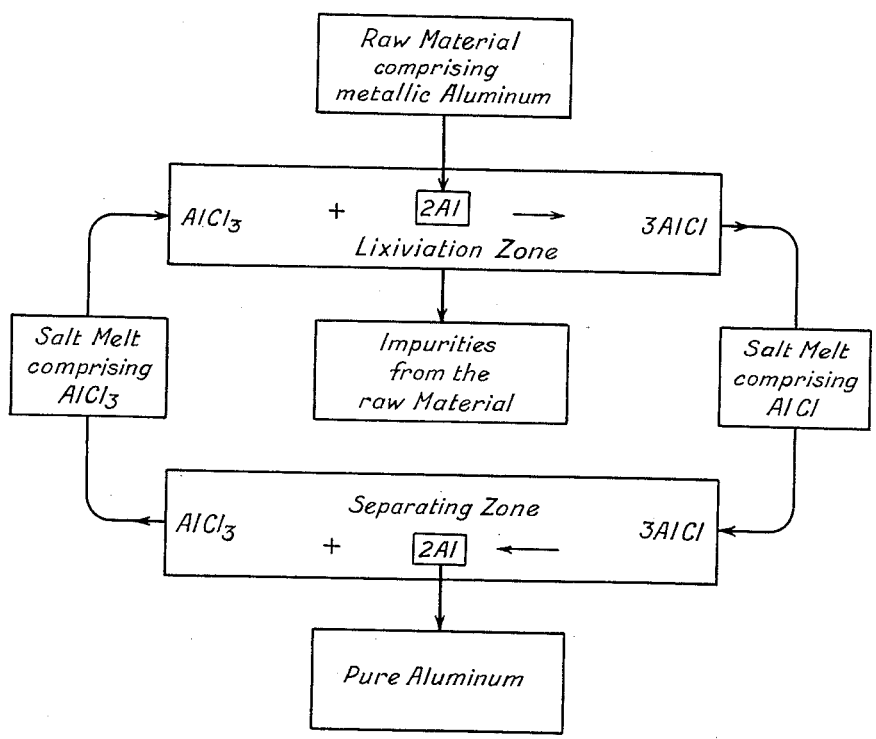

Patented Dec. 9, 1952

2,621,120

UNITED STATES PATENT OFFICE 2,621,120

PROCESS OF REFINING ALUMINUM

Knut Harald Pedersen and Hans Jörgen Bauck, Trondheim, Norway, assignors to A/S Årdal Verk, Oslo, Norway Application July 20, 1949, Serial No. 105,870
In Norway September 20, 1945

10 Claims. (Cl. 75—68)

Aluminum, as produced by some of the ordinary commercial processes now in use, or as recovered as scrap, technical aluminum alloys and the like, normally contains impurities the amount and nature of which depend upon the origin of the raw material.

The present invention relates to the manufacture of pure aluminum from impure aluminum of said kind, and has for its object a process of producing pure aluminum by passing extractant over alloys or mixture of aluminum with other elements.

According to an important feature of this process the impure aluminum is subjected to the action of a melt comprising an aluminum halide, which results in a fractional reaction with the aluminum in the treated impure aluminum, an aluminum compound soluble in the melt being formed, whereupon the melt containing the aluminum compound formed is removed from the raw material and then the temperature of the melt is lowered, whereby aluminum metal is caused to be formed, which metal is separated from the salt melt. Pure aluminum is thus obtained.

By the action of the aluminum halide on the aluminum in the raw material, aluminum subhalide will be formed which dissolves in the melt, and which is subsequently decomposed when lowering the temperature of the melt, pure metallic aluminum being liberated and the aluminum halide having reacted with the aluminum formed anew.

Several methods for the purpose of refining aluminum have previously been proposed. In the U. S. A. patent specification No. 2,184,705 (Willmore) is thus described a distillation process of refining aluminum. By this process halides are mixed with impure aluminum and the mixture is heated to elevated temperatures in a heating chamber in an atmosphere effectively inert to aluminum (a very high vacuum is used) to vaporize from the mixture metallic aluminum and halide, then the vapors are condensed in a condensing chamber and eventually the aluminum is separated from the condensate.

The high temperature and the high vacuum is necessary for the above mentioned Willmore process due to the relative low vapor pressure of the aluminum subhalide.

Our process is different from the known method. The principal difference consists in that the aluminum is not refined by distillation. The entire process being performed in the liquid phase with aluminum halide melts, in which aluminum subhalide is formed and dissolved in the melt by the temperature used and then the melt containing the subhalide is removed from the raw material and cooled so that pure aluminum is formed from the subhalide. The pure aluminum thus formed is then separated from the melt which is used again in the purification or extraction of further aluminum from the raw material.

By the process according to the invention the use of expensive distillation apparatus is not necessary and further the heating costs for the distillation are avoided.

Further, by the known process it is necessary to use vacuum, whereas by the present process it is advisable to use atmospheric pressure or pressure above one atmosphere depending on the vapor pressure of the salt melt used.

The present invention is based on the discovery that it is possible in a very effective way to utilize the thermodynamic equilibria between solid or liquid aluminum, liquid aluminum halide and aluminum subhalide in the liquid phase in the production of pure aluminum.

The melt employed may consist of a single halide or of a mixture of two or more halides, with or without other components. Aluminum chloride ($AlCl_3$) is preferably used, but other aluminum halides, for instance aluminum-fluoride, -bromide, -iodide, may also be used.

Requisite properties of a salt melt to be used in the present process are the following:

1. The salt melt should have the greatest possible content of aluminum-halide in order to make the rate of conversion as great as possible.

2. At the working temperature used, the salt melt should have the lowest possible vapor-pressure.

Salt melts consisting of pure $AlF_3$ or $AlCl_3$ or $AlBr_3$ are not suitable for the process owing to the high pressures necessary for keeping the aluminum halide in liquid condition at the temperatures to be used in the process. A salt melt consisting of pure $AlI_3$ may however be kept in liquid condition by use of a comparatively moderate over-pressure at the temperatures to be used in the process.

The matter presents itself in a different way by addition of alkali-halides and earth-alkali-halides.

The system $AlF_3$-$NaF$ may be used with advantage for the process. Melts with the highest possible content of $AlF_3$ will be preferable, but this again causes a relatively greater $AlF_3$ partial-pressure.

The system $AlCl_3$-$NaCl$ has preferably been used as a salt melt and then particularly in the mol-proportion of 1:1. It can be proved that the complex $(AlCl_4)^-$ is the most stable of the system, wherefore the vapor-pressure of the combination $AlCl_3.NaCl$ will be low. While $AlCl_3$ sublimes at 180° C. the $AlCl_3$-partial-pressure above the combination $AlCl_3.NaCl$ is only 150 mm. Hg at 700° C.

For the system $AlCl_3$-KCl the same point of view as the preceding can be presented. However, reactive-kinetic considerations will affect the selection of inactive salt-component.

From the preceding can be deduced that aluminum-halides together with the other salt-components will with the greatest advantage have to be used for the present process. Amongst the pure halide melts, $AlI_3$ can possibly be used if over-pressure is made use of. The degree of formation for $AlI_3$ at temperatures about 500° C. is probably great and even if $AlI_3$ is a relatively expensive compound one can scarcely completely eliminate the possibility of using the same.

It has been ascertained that the process operates without disturbance by the use of pressure of one atmosphere or higher. Furthermore it has been found that the reaction velocity increases with increasing percentage of aluminum chloride or halide respectively and also with rising temperature of operation.

Thus salt melts are capable of being employed, which have a substantial vapor pressure at a higher operation temperature and which necessitate the use of a closed extraction apparatus.

When selecting components for the salt mixtures to be employed one should usually try to avoid such components which at the operation temperature may be liable to contaminate the refined product due to solidification.

Alkali and earth alkali metal salts have been found to be particularly well suited as constituents so that the salt melt will have a suitable melting point and a low vapor pressure.

For the salt melts the system $AlCl_3/NaCl$ has preferably been used, but also $AlCl_3/KCl$, $AlCl_3/MgCl_2$, $AlF_3/NaF$, $AlBr_3/NaCl$, $AlBr_3/KCl$, $AlBr_3/KBr$ and $AlI_3/NaCl$ have been employed.

The aluminum-bearing material, which is to be subjected to the treatment with the salt melt, may have been obtained in any suitable manner. It may for example consist of commercial aluminum as obtained from aluminum factories, aluminum scrap, commercial aluminum alloys and the like. Crude alloys as obtained for example by thermic methods are suitable raw materials. The character and percentage of impurities in the treated material (impure aluminum, crude alloys and the like) are factors of little technical importance, but there is obviously advantage from an economical point of view, when the percentage of aluminum is high.

The temperatures used when causing aluminum trihalide in the melt to react with aluminum metal in the raw material so as to form aluminum subhalide and the temperatures used when causing aluminum metal to be formed from the aluminum subhalide in the melt, separated from the raw material will be governed by the halides and the apparatus being used. As a general rule it may, however, be stated that temperatures between 400° C. and 1100° C. have to be used when aluminum subhalide is to be formed and the temperature to be used when decomposing the formed aluminum subhalide, has to be lower than the temperature used in the first step.

In the process according to the invention one has, as stated above, to do with a thermodynamic equilibria. Thus, at a certain temperature above 300° C. a certain amount of subhalide will be formed, but when cooling the melt some part of the subhalide will decompose, thus forming pure aluminum metal and trihalide. The principal point is, as will be understood, that the raw material is brought in contact with the melt containing aluminum halide at temperatures between 400° C. and 1100° C. to establish an equilibria in the melt which then will contain a certain amount of subhalide, and then the melt is removed from the raw material and the temperature of the melt is lowered, thus causing pure aluminum to be formed, which is separated and collected as such. The remaining melt may be reheated and returned to contact anew with the initial material containing aluminum metal.

The formation of the subhalides may, for example, take place at 500° C. and the subsequent decomposition at 300° C. Or one may for example operate also at temperatures above the melting point of aluminum, for example at 700° C. and thereupon bring about a partial decomposition of the subhalides by cooling the same to 650° C.

For the purpose of reducing the heating costs it is advisable to use a relatively slight decrease of the temperature from the reaction zone to the decomposition zone. Further it has been proved that the reaction proceeds faster when such temperatures are used that the raw materials are present in molten condition. The raw materials are preferably melted before they are introduced in the extraction chamber or lixiviation zone.

The temperatures which are used in actual manufacturing practice will, of course, be dependent on a great many factors.

The significance of the temperature will be more easily understood by the following description.

A liquid salt melt consisting partly of aluminum chloride is brought into intimate contact with the impure aluminum to be treated, at an elevated temperature between 400° C. and 1000° C.; when the reaction is carried out at the highest temperatures within this range, it is necessary to use a closed extraction apparatus in order to avoid vaporization.

Above 300° C. the following thermodynamic equilibrium will be established between the aluminum metal in the impure aluminum and the aluminum chloride on the one hand and the aluminum subchloride on the other hand:

$$AlCl_3 + 2Al \rightleftharpoons 3AlCl$$

At a certain temperature a definite concentration of aluminum subchloride will be present in the melt.

As a general rule it can be stated that the metal-halides acquire an increasing melting point by decreasing valency.

The aluminum-subchloride will consequently have a higher melting point than the aluminum-trichloride and the boiling point will be estimated at approximately 800° C. However, all probability indications are that the aluminum-subchloride does not appear in a free state in a melt comprising aluminum-trichloride but is complexly combined to a compound with a low vapor pressure.

At a pressure of one atmosphere there have been found no indications of any vaporization of the aluminum-subchloride. Nevertheless the subhalide, has at the temperature used a vapor pressure so that a certain partial pressure has to be considered. This partial pressure does not mean any loss because the system of refining is closed and the insignificant quantities of gaseous sub-halide which might exist above the melt are not an object for utilization.

At 300° C. the above mentioned equilibrium will give a very small amount of aluminum subchloride.

The increasing of the temperature, however, will result in a displacement to the right and for this reason it will be understood that it is suitable to carry out the subchloride formation step of the process above 300° C. The carrying out of the process above 300° C. is also advantageous due to the fact that the reaction velocity increases with the temperature. Temperatures between 500° C. and 1000° C. and especially between 700° C. and 900° C. are used with satisfactory results when performing the process with a salt melt containing aluminum chloride. The exact temperature varies, depending upon the raw material to be extracted, and the apparatus used.

The highest temperatures in the stated range require closed extraction apparatus in order to avoid excessive vaporization of the salts used in the process. The temperature used depends on the melt, as it may be convenient to add indifferent substances for the purpose of reducing the vapor pressure of the salt melt.

The melt may have been heated beforehand to the desired reaction or lixiviation temperature, for example by being passed in continuous flow through a heating zone before it reaches the metal or raw material or the temperature may be adjusted by the supply of heat to the initial material or also by a combination of various heating methods.

When the melt has been approximately saturated with the aluminum subchloride, the melt is removed from the subchloride zone, and is then cooled, so as to bring about a sufficient rate of decomposition of the subchloride formed. Any degree of cooling the salt melt necessarily will result in a displacement of the equilibrium

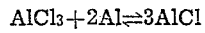

to the left.

Dependent on the rate of cooling, a greater or less quantity of refined pure aluminum is capable of being separated out and at the same time aluminum trichloride is formed.

The process is capable of being carried into effect at temperatures above the melting point of aluminum as well as temperatures below this melting point. The temperature in the extraction apparatus may for example be so chosen that the raw material and the reacting melt are in a molten condition, while the refined product, the pure aluminum, separates out in the solid phase, in the form of crystals, which can readily be molten together after having been removed from the salt melt.

As an example of the operation of our process the aluminum-containing raw material may be treated with the aluminum chloride containing salt melt at a temperature of 750° C. (the melting point of aluminum is known to be 657° C.), after the reaction has taken place the salt melt is removed from the raw material and then the salt melt is cooled to 680° C., whereby the aluminum subchloride is decomposed to aluminum trichloride and liquid metallic aluminum.

As another example of operation of the process may be mentioned the following:

The aluminum-trichloride (AlCl₃) containing melt is brought to react with the raw material at about 650° C. (that is below the melting point of aluminum), the salt melt is removed from the raw material and then cooled to about 400° C. The pure aluminum separated out by decomposition of the aluminum subchloride in this case will be in a solid state.

The accompanying drawing illustrates in a diagrammatical way two embodiments of an apparatus for performing our process.

In Fig. 1 a refining cell is shown in vertical section. The cell shown on this figure is used when separating the refined aluminum in solid state. In Fig. 2 a refining cell is shown in vertical section. The cell shown on this figure is to be used when separating the refined aluminum in liquid state.

In the following we will describe the apparatus shown on Fig. 1 and the method of working when using this apparatus.

The device consists of a container 1 of refractory material for instance refractory clay and is provided with a lining indicated by 2, also of refractory material for instance a silicon-carbide lining. In the container are located electrical wires indicated by 3, serving the purpose of heating the container and its content. These wires may conveniently be connected with the electrical current in such a way, that according to requirements it will be possible to heat the various parts of the container separately for instance the lower part only. The container is provided with a tightly closing cover 4 in the center of which is arranged a hollow body 5 of aluminum which extends half way down the container.

In this hollow body is introduced a tube 6 serving the purpose of blowing cold air into the hollow body during the working in order to cool same.

When using the device the raw material 7, the aluminum which has to be refined, is charged at the bottom of the container. In a molten state the salt melt 8, consisting of for instance one part of chloride of aluminum and one part of chloride of sodium is introduced.

The crucible is placed in the inclined position shown in the drawing in order hereby to attain the most effective circulation of the salt melt brought about by heat convection. The circulation of the salt melt took place in the direction indicated by the drawn arrows. The halide of aluminum, for instance chloride, in the salt melt will by contacting the aluminum of the raw material produce a sub-halide of aluminum for instance sub-chloride, and the sub-halide containing melt will thereupon rise by the convection of heat towards the cooling body in the upper part of the container. Owing to the cooling which will take place at the cooling body, the content of subhalide of aluminum of the salt melt will partly be decomposed to aluminum and halide of aluminum, and the aluminum will be deposited on the cooling body as crystals 9. The cooled salt melt will thereupon sink in the crucible and will by getting in contact with the aluminum of the raw material 7 again be able to react with the same under production of sub-halide of aluminum. When sufficient quantities of refined aluminum have been deposited on the cooling body 5, the latter is removed from the crucible and the refined aluminum is scraped off and melted under protection of a cover salt.

The temperature of the raw material 7 and the salt melt which is contacting same is kept for instance at about 700° C. while the salt melt is cooled to about 550 to 600° C. at the upper part of the container near the cooler. A melt consisting of aluminum chloride and sodium chloride which contains approximately molar parts of these compounds has a vapor pressure of about 150 millimeters of mercury at temperatures of about 700° C.

This vapor pressure is of course much lower at about 500° C. which the salt melt presents at the upper part of the container. Any evaporation of significance of the chloride of aluminum will consequently not take place.

In the following the device shown in Figure 2 and the method of working the same will be described.

The device consists of a container or refining cell 1 of refractory material for instance refractory clay and is provided with a refractory lining 2 of for instance carbide of silicon. The lower part of the container is provided with a depression 3 provided with a high frequency coil 4 serving to heat the lower part of the container. In the upper part of the container is arranged a body 5 likewise of refractory material and similarly to the outer container provided with a lining 2. The upper part of this body is forming a cup shaped container 6 at the lower part of which is placed a tapping pipe indicated by 7 which is extending through and out of the container. At the lower part of the cell is likewise a tapping pipe 8. In the channel 9 of the cell is arranged an electric resistance coil 10, serving the heating of the channel 9. At the upper part of the cell are arranged pipes 11 which are cooled by blowing air or water through it. The container is provided with a charging inlet 12 provided with a cover 13.

When using the device the aluminum containing raw material 14 is charged into the container, and above the raw material the halide of aluminum containing salt melt 15 is charged. For instance salt melt consisting of 1 part aluminum fluoride and 3 parts of sodium fluoride may be used in this device. The aluminum containing raw material is kept at a constant temperature by means of a high frequency coil 4 and the salt melt is heated by an electric resistance coil 10 and will thereby, due to the convection of heat, circulate through the refining cell as indicated by the arrows.

The salt melt in contacting the raw material will react with the aluminum content thereof and convert the same to sub-halide of aluminum and the sub-halide of aluminum containing melt will thereupon rise through the channel 9 and subsequently flow over into that part of the refining cell, where the refined aluminum is liberated.

Here the sub-halide of aluminum containing salt melt will get into contact with the tube 11, which is kept cooled by blowing air or water through it. Owing to the cooling the content of sub-halide of aluminum of the salt melt will be decomposed to molten aluminum and halide of aluminum and the aluminum produced thereby will settle in the reservoir 16. As the refined aluminum is settled and collected it is removed through the tapping pipe 7 at intervals. The cooled salt melt, which now contains a reduced quantity of sub-halide or only small quantities of same, then flows back to the raw material through the channel 17 and the salt melt is once more brought to react with the raw material. The difference of temperature of the salt melt in the two vertical channels 9 and 17 is sufficient to bring about the necessary circulation of the salt melt through the refining cell.

The channel 9 is conveniently kept heated to the same temperature as the raw material by means of the electric resistance coil 10. Through the inlet 12 at the top of the refining cell additional raw material, impure aluminum, is charged as the raw material in the cell is being consumed.

Impurities of the raw material will gradually be collected in the refining cell and when this collection of impurities has become so considerable that further refining will become profitless, the raw material together with the collected impurities is removed through the tapping pipe 8 and fresh raw material is charged through the inlet 12 at the top of the refining cell.

When using a salt melt consisting of aluminum fluoride and sodium fluoride in molecular proportion 1:3, the temperature of the raw material and the melt contacting the same is kept for instance at about 1050° C. and the salt melt is cooled to about 950° C. at the upper part of the cell near the coolers.

*Example 1*

In a refining cell, in which the continuous circulation of the salt melt between the extraction zone and the separating zone was affected by the heat convection, a salt melt consisting of aluminum trichloride and potassium chloride in the molecular proportion 1:1 was used. The starting material consisted of aluminum scrap containing impurities as follows: 0.45% Si, 0.40% Mn, 0.83% Fe, 0.46% Mg and 0.53% Cu. This material was brought into contact with the salt melt at 650° C. The salt melt, which after interaction with the aluminum of the starting material contained aluminum subchloride, was then moved to the spot where the refined product was to be separated.

There the salt melt was cooled to 400° C., whereupon the aluminum-subchloride was partly decomposed to aluminum-trichloride and aluminum which was separated in the form of crystals with a fineness of 99.98%. The salt melt was then again caused to react with the starting material after having been heated to 650° C.

*Example 2*

A salt melt consisting of aluminum fluoride and sodium fluoride in molecular proportion 1:3 was brought into contact with an electro-thermically produced aluminum alloy at 1050° C., which contained, in addition to aluminum 37.83% Si, 0.53% Ti, 1.63% $O_2$ and C, 0.91% Fe, 0.04% Cu and 0.07% Na. The salt melt, which, after having reacted with the starting material, contained aluminum subfluoride, was then cooled to 950° C., whereby aluminum with a purity of 99.85% was separated out in liquid form. Refinement was effected until 83% of the aluminum content in the starting material had been extracted, the residue of the starting material was then removed and a new portion was passed into the refining cell.

*Example 3*

An aluminum raw material containing impurities as follows: 0.5% Fe, and 4.6% Si was brought in contact with a salt melt consisting of aluminum-trichloride and magnesium-chloride in the molecular proportion 2:1. The salt melt which, after having reacted with the aluminum in the raw material at a temperature of 700° C. and containing aluminum subchloride, was then removed from the raw material and cooled to 500° C., whereby the aluminum-subchloride was partly decomposed to aluminum-trichloride and aluminum which was separated in the form of crystals with a fineness of 99.97%. The salt melt was then again caused to react with the raw material after again being heated to 700° C.

When the chemically combined aluminum has been liberated, the salt melt may be returned and employed anew, theoretically without being consumed. The impurities from the raw material will not react with or be dissolved in the salt melt, and the concentration of the impurities will thus increase in the extraction or lixiviation zone. When the impurities have reached a certain amount, they are removed from the lixiviation zone by tapping or in some other convenient way. The cooling of the melt is carried out in such a way, that the refined product separates out and is not recycled with the regenerated salt melt which anew enters into contact with the initial material.

By suitable construction of the apparatus employed and by maintaining a suitable temperature difference between the extraction and separating zones, it is possible to bring about a circulation movement of the salt melt solely by means of heat convection. The circulation movement may, however, also be brought about by suitable mechanical means or by a combination of both of these methods.

When the process is carried into effect using aluminum bromide or aluminum iodide in the salt melt, it is most satisfactory to operate the process at temperatures between 400° C. and 700° C. The reaction equations for these halides will be as follows:

$$AlBr_3 + 2Al \rightleftharpoons 3AlBr$$

or $$AlI_3 + 2Al \rightleftharpoons 3AlI$$

When the process is carried into effect using aluminum trifluoride in the salt melt, it is most satisfactory to operate the process at temperatures between 800° C. and 1100° C. The thermodynamic equilibrium prevailing in the salt melt then will be as follows:

$$AlF_3 + 2Al \rightleftharpoons 3AlF$$

The process is further illustrated by means of the attached flow sheet which shows the various steps in connection with the performance of the process with a melt containing aluminum chloride.

This application is a continuation-in-part of application Serial No. 687,535, now abandoned.

We claim:

1. Process for the manufacture of refined aluminum metal from raw material containing aluminum metal together with impurities comprising the steps of preparing a fluid salt melt selected from the group consisting of aluminum trichloride, aluminum trifluoride, and blends of an aluminum trihalide with a halide of an alkali forming metal, wherein the aluminum trihalide of the blend is present in a quantity of at least one-third of the total quantity of salt in the blend, contacting this fluid salt melt in the fluid state with the raw metallic aluminum containing material at a temperature in the range of 400° C. to 1100° C., thereby causing the aluminum trihalide in the salt melt to react with aluminum metal in the raw material to form aluminum subhalide which dissolves in said salt melt, reducing the temperature of the salt melt containing the dissolved aluminum subhalide to a temperature lower than the extraction temperature while still maintaining the melt in the liquid state in the temperature range of 300° C. to 1050° C., thereby causing free aluminum metal and aluminum trihalide to be formed in the salt melt, separating the aluminum metal so formed from the salt melt at a temperature at which the salt melt is still fluid, then reheating said melt and contacting it in reheated condition with a fresh quantity of raw material containing aluminum metal and impurities.

2. Process for the manufacture of refined aluminum metal from raw material containing aluminum metal together with impurities comprising the steps of preparing a fluid salt melt comprising aluminum trichloride and sodium chloride in which the aluminum trichloride comprises at least one-third of the salt melt blend, contacting said salt melt in the fluid state with said raw material containing metallic aluminum at a temperature in the range of 500° C. to 1000° C. thereby causing aluminum trihalide in the melt to react with the aluminum metal in the raw material to form aluminum subchloride which dissolves in said melt, removing the salt melt in liquid form from contact with the raw material, lowering the temperature of said salt melt containing aluminum to a substantially lower temperature than the first temperature used in the range of 300° C. to 700° C., thereby causing aluminum metal and aluminum trichloride to be formed, separating the aluminum metal so formed from the melt containing the same at a temperature at which the melt is still fluid, and then reheating the melt and contacting it in reheated condition with fresh quantities of raw material containing aluminum metal and impurities.

3. Process for the manufacture of refined aluminum metal from raw material containing aluminum metal together with impurities comprising the steps of preparing a fluid salt melt comprising aluminum trichloride and sodium chloride in which the aluminum trichloride comprises at least one-third of the salt melt blend, contacting said salt melt in the fluid state with said raw material containing metallic aluminum at a temperature in the range of 700° C. to 900° C. thereby causing aluminum trihalide in the melt to react with the aluminum metal in the raw material to form aluminum subchloride which dissolves in said melt, removing the salt melt in liquid form from contact with the raw material, lowering the temperature of said salt melt containing aluminum to a substantially lower temperature than the first temperature used in the range of 650° C. to 800° C., thereby causing aluminum metal and aluminum trichloride to be formed, separating the aluminum metal so formed from the melt containing the same at a temperature at which the melt is still fluid, and then reheating the melt and contacting it in reheated condition with fresh quantities of raw material containing aluminum metal and impurities.

4. Process for the manufacture of refined aluminum metal from raw material containing aluminum metal together with impurities comprising the steps of preparing a fluid salt melt comprising a blend of aluminum trifluoride and a halide of an alkali forming metal in which the aluminum trifluoride is present in a quantity of at least one-third of the blend, contacting this fluid salt melt in the fluid state with the raw metallic aluminum containing material at a temperature in the range of 800° C. to 1100° C. thereby causing the aluminum trifluoride in the salt melt to react with aluminum metal in the raw material to form aluminum subfloride which dissolves in said salt melt, reducing the temperature of the salt melt containing the dissolved aluminum subfloride to a temperature lower than the extraction temperature while still maintaining the melt in the liquid state in the temperature range of 700° C. to 1050° C. thereby causing free aluminum metal and aluminum trifluoride to be formed in the salt melt, separating the aluminum metal so formed from the salt melt at a temperature at which the salt melt is still fluid, then reheating said melt and contacting it in reheated condition with a fresh quantity of raw material containing aluminum metal and impurities.

5. Process for the manufacture of refined aluminum metal from raw material containing aluminum metal together with impurities comprising the steps of preparing a fluid salt melt comprising a blend of aluminum tribromide and a halide of an alkali forming metal in which the aluminum tribromide is present in a quantity of at least one-third of the blend, contacting this fluid salt melt in the fluid state with the raw metallic aluminum containing material at a temperature in the range of 400° C. to 700° C. thereby causing the aluminum tribromide in the salt melt to react with aluminum metal in the raw material to form aluminum subbromide which dissolves in said salt melt, reducing the temperature of the salt melt containing the dissolved aluminum subbromide to a temperature lower than the extraction temperature while still maintaining the melt in the liquid state in the temperature range of 300° C. to 660° C. thereby causing free aluminum metal and aluminum tribromide to be formed in the salt melt, separating the aluminum metal so formed from the salt melt at a temperature at which the salt melt is still fluid, then reheating said melt and contacting it in reheated condition with a fresh quantity of raw material containing aluminum metal and impurities.

6. Process for the manufacture of refined aluminum metal from raw material containing aluminum metal together with impurities comprising the steps of preparing a fluid salt melt comprising a blend of aluminum triiodide and a halide of an alkali forming metal in which the aluminum triiodide is present in a quantity of at least one-third of the blend, contacting this fluid salt melt in the fluid state with the raw metallic aluminum containing material at a temperature in the range of 400° C. to 700° C. thereby causing the aluminum triiodide in the salt melt to react with aluminum metal in the raw material to form aluminum subiodide which dissolves in said salt melt, reducing the temperature of the salt melt containing the dissolved aluminum subiodide to a temperature lower than the extraction temperature while still maintaining the melt in the liquid state in the temperature range of 300° C. to 660° C. thereby causing free aluminum metal and aluminum triiodide to be formed in the salt melt, separating the aluminum metal so formed from the salt melt at a temperature at which the salt melt is still fluid, then reheating said melt and contacting it in reheated condition with a fresh quantity of raw material containing aluminum metal and impurities.

7. The method as defined in claim 2, wherein the salt melt is a blend of aluminum trichloride and sodium chloride in the proportion of approximately 1 mol of aluminum trihalide for each mol of sodium chloride.

8. The method as defined in claim 3, wherein the salt melt is a blend of aluminum trichloride and sodium chloride in the proportion of approximately 1 mol of aluminum trichloride for each mol of sodium chloride.

9. The method as defined in claim 2, wherein the process is carried out in a sealed apparatus preventing volatilization of the salt contained in the melt.

10. The method of extracting metallic aluminum from aluminum containing impurities comprising introducing a fused aluminum trihalide salt in a closed system preventing vaporization of said salt, passing said salt melt over the aluminum containing raw materials at a temperature in the range of 400° C. to 1100° C. to convert the metallic aluminum to an aluminum subhalide soluble in said fused salt melt, removing said salt melt containing the dissolved aluminum subhalide in liquid form from the reaction zone and cooling said salt melt to a temperature below the temperature of reaction at which the metal was extracted in the range of 300° C. to 1050° C., whereby refined metallic aluminum is precipitated from said solution.

KNUT HARALD PEDERSEN.
HANS JÖRGEN BAUCK.

REFERENCES CITED

The following references are of record in the file of this patent:

UNITED STATES PATENTS

| Number | Name | Date |
|---|---|---|
| 1,180,435 | Robison | Apr. 25, 1916 |
| 2,056,233 | Stroup | Oct. 6, 1936 |
| 2,184,705 | Willmore | Dec. 26, 1939 |
| 2,195,217 | Lindenberger | Mar. 26, 1940 |

OTHER REFERENCES

Mellor, Comprehensive Treatise on Inorganic and Theoretical Chemistry, vol. 5, published 1924 by Longmans, Green & Co., London, New York and Toronto, page 311.